United States Patent [19]
Ohshima et al.

[11] Patent Number: 5,920,528
[45] Date of Patent: Jul. 6, 1999

[54] OPTICAL DISC APPARATUS AND METHOD OF TRACKING CONTROL OF OPTICAL DISC APPARATUS

[75] Inventors: Yoichi Ohshima; Minoru Hashimoto, both of Chiba, Japan

[73] Assignee: Sony Corporation, Tokyo, Japan

[21] Appl. No.: 08/872,637

[22] Filed: Jun. 10, 1997

[30]     Foreign Application Priority Data

Jun. 19, 1996  [JP]  Japan .................................. 8-158099

[51] Int. Cl.$^6$ .................................................. G11B 7/09
[52] U.S. Cl. ................................. 369/44.29; 369/44.35
[58] Field of Search ........................... 369/44.29, 44.28, 369/44.35, 44.36, 44.34, 44.32, 54

[56]         References Cited

U.S. PATENT DOCUMENTS

| | | | |
|---|---|---|---|
| 5,210,732 | 5/1993 | Suenaga | 369/44.29 |
| 5,285,431 | 2/1994 | Ogawa | 369/44.28 |
| 5,285,432 | 2/1994 | Nakane | 369/44.28 |
| 5,446,713 | 8/1995 | Tateishi | 369/44.28 |
| 5,577,009 | 11/1996 | Takamine | 369/44.29 |
| 5,671,200 | 9/1997 | Yamaguchi | 369/44.29 |

*Primary Examiner*—Thang V. Tran
*Attorney, Agent, or Firm*—Limbach & Limbach L.L.P.

[57]          ABSTRACT

An optical disc apparatus for recording and/or reproducing with respect to an optical disc, comprises a light source for emitting a laser beam; an object lens for focusing the laser beam toward the optical disc; a supporting device which supports the object lens; a sled portion which holds this supporting device; a transporting means for moving the sled portion in the radial direction of the optical disc; a center point servo control means for detecting the movement of the object lens and moving the supporting device so that the object lens is maintained at a predetermined position; a tracking servo control means for generating a tracking error signal and moving the supporting device, so that the object lens is held on the desired track of the optical disc; a frequency detecting means for detecting the frequency of the tracking error signal; and a servo control selecting means for selectively selecting the center point servo control means or the tracking servo control means based on the frequency.

8 Claims, 6 Drawing Sheets

SLED DRIVE SIGNAL

FIG. 2B

TRACKING SERVO ENABLE SIGNAL

FIG. 2C

CENTER POINT SERVO ENABLE SIGNAL

SLED DRIVE SIGNAL SD

FIG. 6B

TRACKING ERROR SIGNAL TE

FIG. 6C

CENTER POINT SERVO ENABLE SIGNAL

FIG. 6D

TRACKING SERVO ENABLE SIGNAL

OPTICAL DISC APPARATUS AND METHOD OF TRACKING CONTROL OF OPTICAL DISC APPARATUS

BACKGROUND OF THE INVENTION

1. Field of the Invention

The present invention relates to an optical disc apparatus capable of accessing an optical disc recording medium at a high speed and with a high precision and a method of tracking control of the same.

2. Description of the Related Art

In an optical disc apparatus performing the recording and/or reproduction of data with respect to an optical disc such as a compact disc (CD), a seek operation for accessing a desired track is usually carried out by a combination of a rough seek operation for moving an optical pick-up by a sled actuator and a fine seek operation for moving an object lens by the actuator in the optical pick-up.

In the seek operation, first, the optical pick-up is moved by the sled actuator and stopped in the vicinity of a target address. Next, the track pull-in and tracking operation are carried out and the address information reached is read. Then, a fine seek operation, for example, repetition of a step jump (one-track jump) for crossing one track, is carried out to move the object lens of the optical pick-up to the desired track.

Figure 1A:
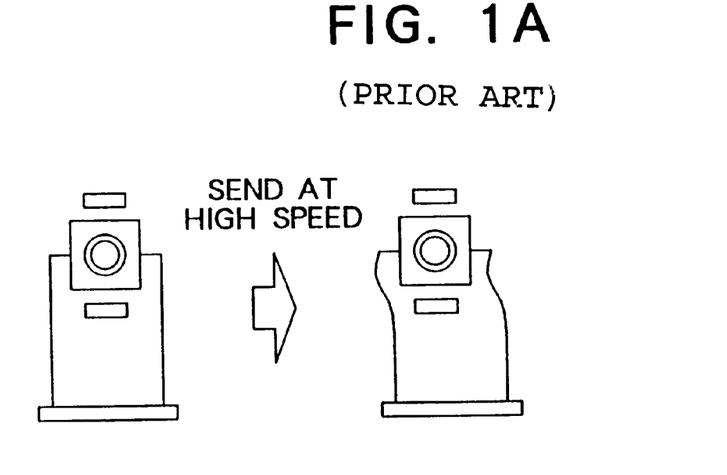
FIGS. 1A and 1B are views explaining center point servo control.
Figure 1B:
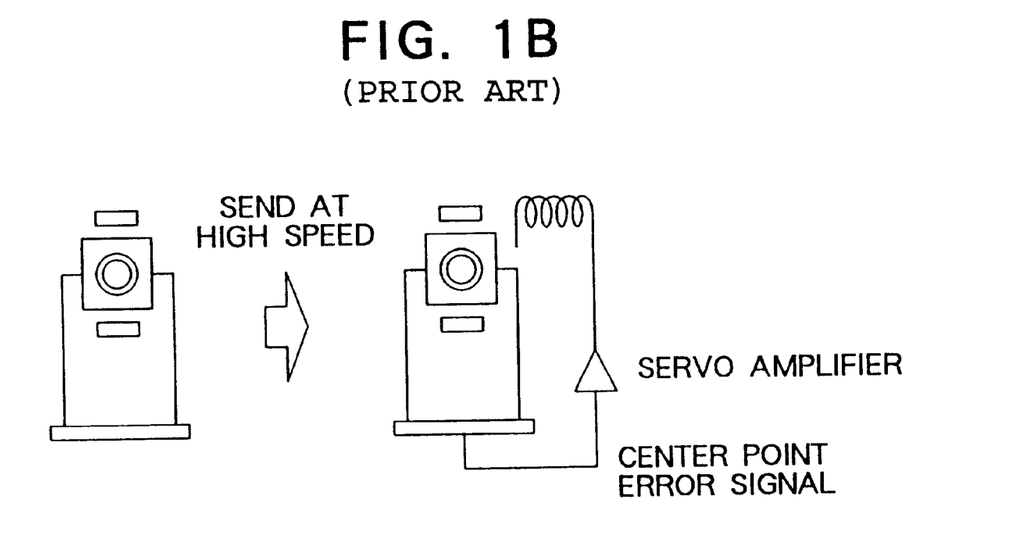

When the sled on which the optical pick-up is mounted is moved at a high speed by the seek operation as mentioned above, as shown in FIG. 1A, the object lens is initially left behind the movement of the sled by the force of inertia and thereafter vibrates. This causes disadvantages. For example, it prevents the reduction and stabilization of settling time and causes deterioration of optical characteristics due to movement of the object lens toward standard scope. Therefore, as shown in FIG. 1B, servo control of the center point of the object lens is frequently carried out to hold the object lens at the center of the field at the time of movement of the sled by using a center point error signal output in proportion to the movement of the object lens toward the scope.

Figure 2A:
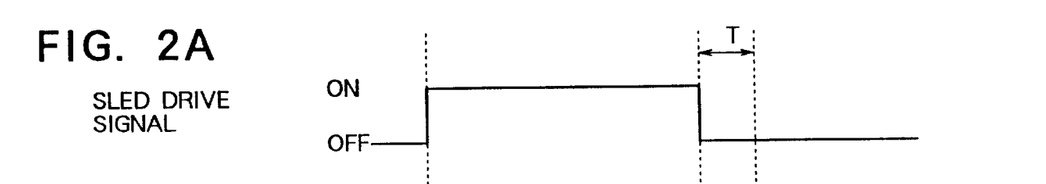
FIGS. 2A to 2C are views of a timing of switching between the center point servo control and tracking servo control at the time of movement of the sled.
Figure 2B:
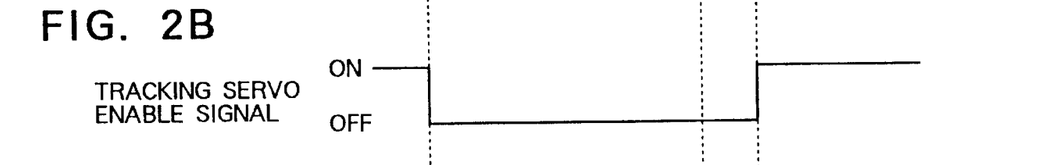
Figure 2C:
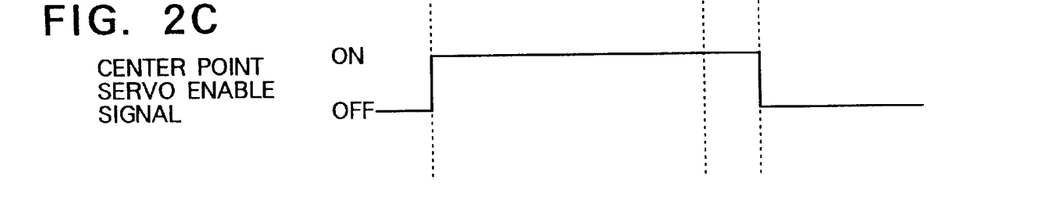

However, when the optical pick-up is stopped after moving the sled, even if center point servo control is carried out as mentioned above, the object lens will vibrate and also the sled itself will vibrate, thus the tracking error signal will vibrate. If the frequency of vibration of this tracking error signal is high, the track pull-in cannot be properly carried out. For this reason, as shown in FIGS. 2A to 2C, after a certain time T elapses from when the sled movement is ended, the mode of control is switched from the center point servo control to the tracking servo control, the track pull-in is carried out, and the tracking servo control is applied. This waiting time T prior to switching is set to, e.g., several milliseconds.

However, the frequency of vibration of the tracking error signal at the end of the movement of the sled as explained above and the time until the vibration sufficiently subsides change considerably depending on various conditions, for example, the eccentricity of the disc. For this reason, the time T until the mode of control is switched from the center point servo control to the tracking servo control as mentioned above, is set to a time sufficiently long enough to cope even with even vibration which takes a long time to subside. As a result, a longer than necessary settling time must often be ensured, so there arises the disadvantage that the speed of accessing a desired track becomes slow. Further, even if a certain long time is set, the possibility of occurrence of a vibration that requires a longer setting time cannot be completely eliminated. Where such a vibration occurs, there also arises a disadvantage in that the track pull-in cannot be adequately carried out and track accessing becomes unstable.

SUMMARY OF THE INVENTION

An object of the present invention is to provide an optical disc apparatus capable of performing track accessing at a higher speed and with a greater stability even in an access operation at which a seek operation is necessary.

Further, another object of the present invention is to provide a control method of the optical disc with which a higher speed and more stable access becomes possible.

According to a first aspect of the present invention, there is provided an optical disc apparatus for recording and/or reproducing with respect to an optical disc, comprising a light source which emits a laser beam; an object lens which focuses a laser beam emitted from the light source toward the optical disc; a supporting device which supports the object lens as the object lens can move in at least a radial direction of the optical disc; a sled portion which holds the supporting device as the supporting device can move in the radial direction of the optical disc; a transporting means for moving the sled portion in the radial direction of the optical disc; a center point servo control means for detecting the movement of the object lens and driving the supporting device so that the object lens is maintained at a predetermined position based on the detected movement; a tracking servo control means for generating a tracking error signal and driving the supporting device based on said tracking error signal; a frequency detecting means for detecting the frequency of the tracking error signal; and a servo control switching means for selectively switching an effective servo control means toward the supporting device between the center point servo control means and the tracking servo control means based on the detected frequency by the frequency detecting means.

Preferably, the frequency detecting means detects a predetermined signal corresponding to the frequency of the tracking error signal and detects that the frequency of the tracking error signal becomes lower than the predetermined frequency based on the detected signal; and the servo control switching means switches an effective servo control means based on the detected result by the frequency detecting means.

Preferably, the servo control switching means makes the center point servo control means valid when the movement of the sled portion is carried out by the transporting means so that the center point servo control is carried out, and makes the tracking servo control means valid when it is detected that the frequency of the tracking error signal becomes lower than the predetermined frequency by the frequency detecting means after the end of movement of the sled portion, so that the tracking servo control is carried out.

Preferably, the frequency detecting means detects the track count signal based on the tracking error signal, and the servo control switching means detects that the tracking error signal becomes lower than the predetermined frequency based on the timing of the track count in the detected track count signal and switches the effective servo control from the center point servo control to the tracking servo control.

According to a second aspect of the present invention, there is provided an optical disc apparatus for recording and/or reproducing with respect to an optical disc, comprising a transporting means for moving an optical pick-up in the radial direction of the optical disc for accessing a desired track of the optical disc; a center point servo control means for detecting the movement of an object lens of the optical pick-up and driving a tracking actuator provided in the optical pick-up so that the object lens is maintained at the predetermined standard position; a tracking servo control means for generating a tracking error signal and driving the tracking actuator based on the tracking error signal; a frequency detecting means for detecting the frequency of the tracking error signal, by detecting a predetermined signal corresponding to the frequency of the tracking error signal and detecting that the frequency of the tracking error signal becomes lower than the predetermined frequency based on the detected signal; and a servo switching selecting means for selectively switching an effective servo control means between the center point servo control means and the tracking servo control means based on the detected output result by the frequency detecting means.

Preferably, the servo control switching means makes the center point servo control means valid when the movement of the optical pick-up is carried out by the transporting means so that the center point servo control is carried out, and makes the tracking servo control means valid when it is detected that the frequency of the tracking error signal becomes lower than the predetermined frequency by the frequency detecting means after the end of movement of the optical pick-up, so that the tracking servo control is carried out.

Preferably, the frequency detecting means detects the tracking count signal based on the track error signal, and the servo control switching means detects that the tracking error signal becomes lower than the predetermined frequency based on the timing of the track count in the detected track count signal and switches the effective servo control from the center point servo control to the tracking servo control.

According to a third aspect of the present invention, there is provided a method of tracking control of an optical disc apparatus, including the steps of carrying out center point servo control for driving a tracking actuator of an optical pick-up so that an object lens mounted on the optical pick-up is maintained at a center of the standard scope when the movement for moving the optical pick-up in the radial direction of the optical disc is started to access the desired track position; detecting a predetermined signal corresponding to the frequency of the tracking error signal when the movement of the optical pick-up is ended; detecting whether or not the frequency of the tracking error signal becomes lower than the predetermined frequency based on the detected predetermined signal; and switching the control mode from the center point servo control to the tracking servo control for driving the tracking actuator so as to adequately follow the track based on the tracking error signal when the frequency of the tracking error signal becomes lower than the predetermined frequency.

BRIEF DESCRIPTION OF THE DRAWINGS

These and other objects and features of the present invention will become more apparent from the following description of the preferred embodiments given with reference to the attached drawings, wherein

FIGS. 4A and 4B are views for explaining an error signal detection unit of the tracking servo control system shown in FIG. 3, in which

FIGS. 6A to 6D are views for explaining the operation of the tracking servo control system shown in FIG. 3, in which

DESCRIPTION OF THE PREFERRED EMBODIMENT;

An embodiment of the present invention will be explained next by referring to FIG. 3 to FIGS. 6A to 6D.

In the present embodiment, description is made with reference to a tracking servo control system which controls the movement of a sled on which an optical pick-up is mounted, performs tracking servo control, performs center point servo control, etc. and thereby controls the position of the optical beam with respect to the track in an optical disc apparatus. Note that the optical pick-up is fixed to the sled and supports an object lens 11 so that it can move with respect to the sled.

Figure 3:
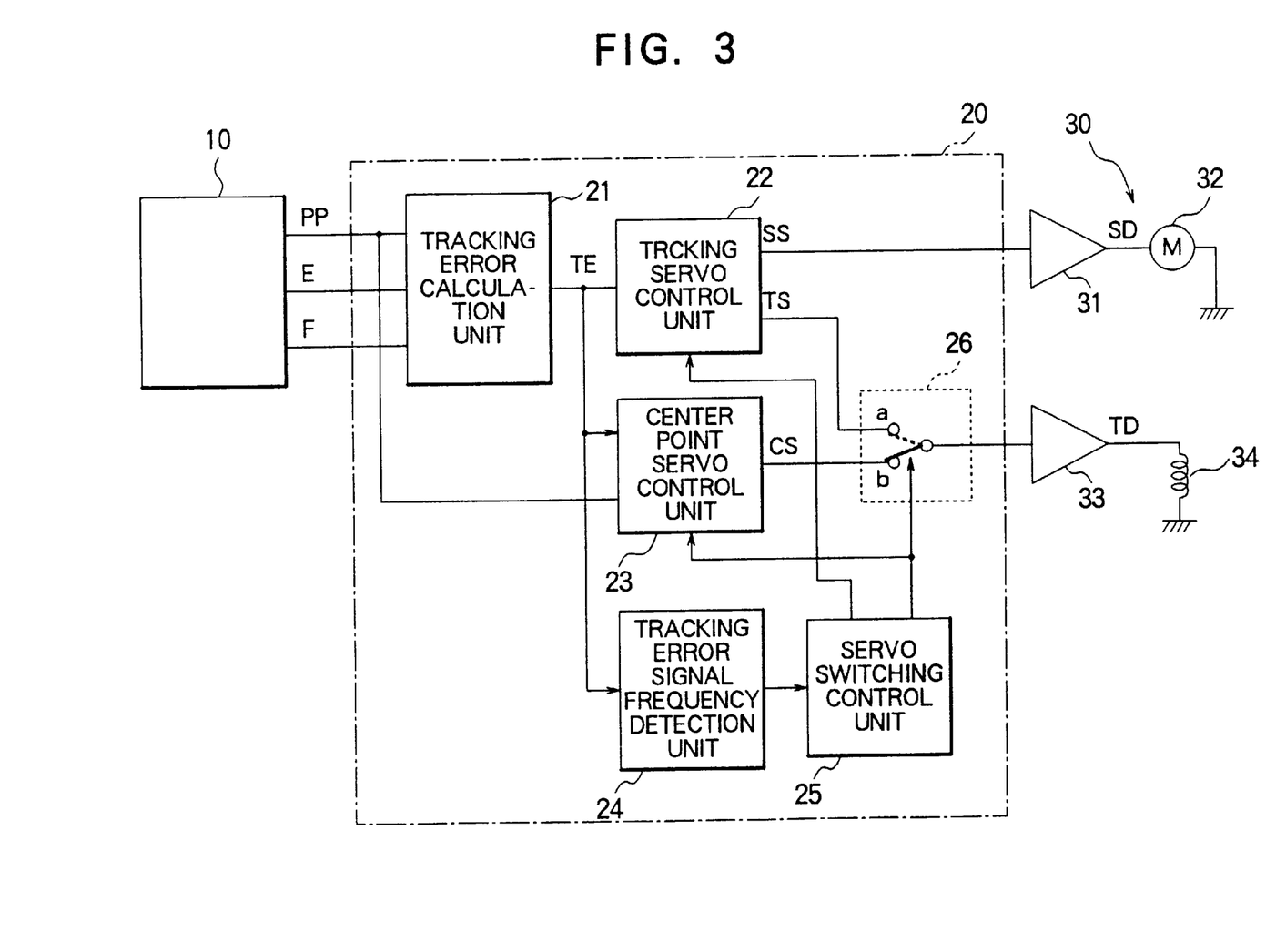
FIG. 3 is a view of the configuration of a tracking servo control system of an embodiment of the present invention.

FIG. 3 is a view of the configuration of the tracking servo control system.

The tracking servo control system 1 has an error signal detection unit 10, a signal processing unit 20, and an operation unit 30. The signal processing unit 20 has a tracking error calculation unit 21, a tracking servo control unit 22, a center point servo control unit 23, a tracking error signal frequency detection unit 24, a servo switching control unit 25, and a switch 26. Further, the operation unit 30 has a sled motor drive amplifier 31, a sled motor 32 for moving the sled, a tracking coil drive amplifier 33, and a tracking coil 34.

First, an explanation will be made of the operation of the parts.

The error signal detection unit 10 detects light which was emitted from a not illustrated light source, irradiated to the optical disc via the object lens 11, diffracted, and reflected, generates light detection signals E and F in accordance with the amount of the light reflected to the left side and the right side of the track and a push/pull signal PP, and outputs the same to the signal processing unit 20.

Figure 4A:
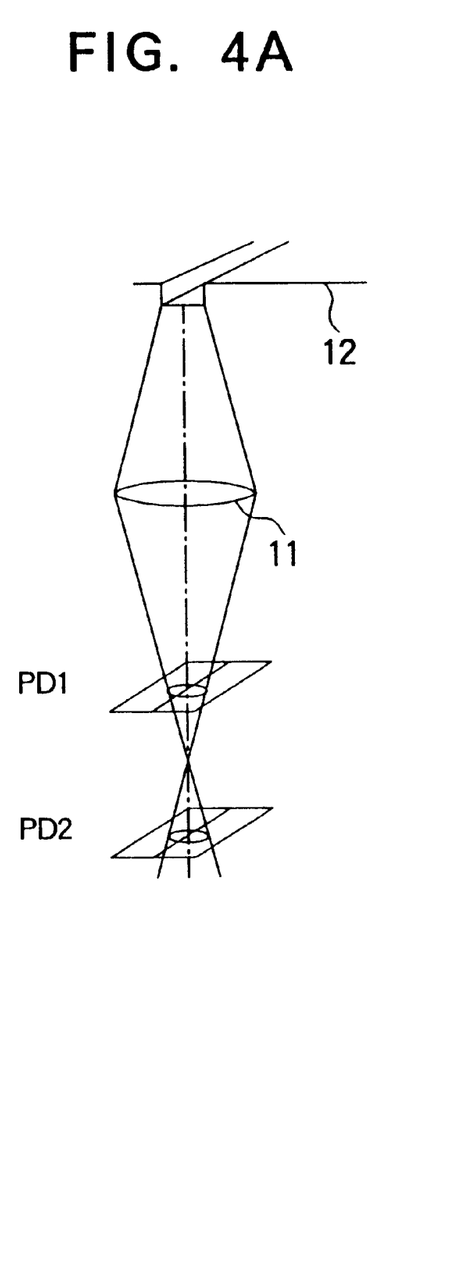
FIG. 4A is a view of a positional relationship of reflected light of an optical beam and photodetectors.
Figure 4B:
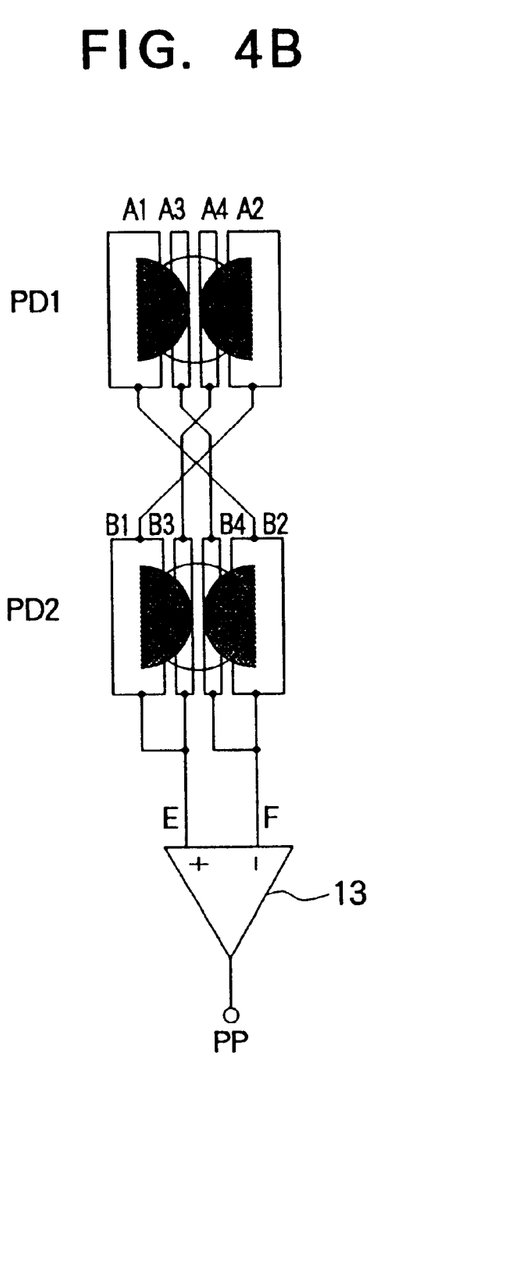
FIG. 4B is a view of the configuration of the error signal detection unit.

The concrete configuration of that error signal detection unit 10 is shown in FIGS. 4A and 4B.

FIGS. 4A and 4B are views for explaining the error signal detection unit 10 of the tracking servo control system 1, in which FIG. 4A is a view showing a positional relationship of reflected light of the optical beam and the photodetectors PD1 and PD2; and FIG. 4B is a view of a configuration of the error signal detection unit 10.

In FIG. 4A, the optical beam irradiated to the recording surface 12 of the optical disc via the object lens 11 is made incident upon the photodetectors PD1 and PD2 via the object lens 11 again. The photodetectors PD1 and PD2 are disposed at equal distances from the focal point and sandwich the same. They are each divided into four pieces as shown in FIG. 4B. Note that, the object lens 11 is supported by a not illustrated supporting member so that it can move in a focusing direction and a tracking direction and is moved by a not illustrated actuator.

In the error signal detection unit 10, signals E and F indicating the intensity of the light reflected to the left side of the track and the light reflected to the right side are generated based on the light detection signals output from the divided photodetectors of the photodetectors PD1 and PD2. More specifically, when assuming that the output signals from the photodetectors of the photodetectors PD1 and PD2 are A1 to A4 and B1 to B4 as shown in FIG. 4B, E becomes equal to A2+A4+B1+B3, and F becomes equal to A1+A3+B2+B4. Further, a difference of those signals E and F is found in a subtracter 13, and a push/pull signal PP is generated. The found signals of E, F, and PP are output to the signal processing unit 20.

The tracking error calculation unit 21 of the signal processing unit 20 calculates the tracking error signal TE indicating the positional relationship of the optical beam and the track in a radial direction (tracking direction) based on the light detection signals E and F and the push/pull signal PP input from the error signal detection unit 10 and outputs the same to the tracking servo control unit 22 and the center point servo control unit 23.

The tracking servo control unit 22 appropriately generates a sled servo signal SS for driving the sled motor 32 and a tracking servo signal TS for driving the tracking coil 34 based on the tracking error signal TE input from the tracking error calculation unit 21 and outputs the same to the sled motor drive amplifier 31 and the switch 26. To the tracking servo control unit 22, the predetermined control signals including the tracking servo enable signal are input from the servo switching control unit 25. It makes the tracking error signal valid or invalid based on these control signals and generates the sled servo signal SS when performing the sled movement.

The center point servo control unit 23 becomes substantially valid based on the center point servo enable signal input from the servo switching control unit 25, generates the center point servo signal CS for driving the tracking coil 34 for maintaining the tracking servo control system 11 at the center of the field based on the push/pull signal PP input from the error signal detection unit 10 and the tracking error signal TE input from the tracking error calculation unit 21, and outputs the same to the switch 26.

The tracking error signal frequency detection unit 24 detects a predetermined amount corresponding to the frequency of vibration of the tracking error signal when the sled movement is ended. In the present embodiment, the tracking error signals are compared to detect a traverse signal, a traverse interval of the, traverse signal is detected, and the result is output: to the servo switching control unit 25.

The servo switching control unit 25 switches the operation of the tracking servo control unit 2:2 and the center point servo control unit 23 and the switch 26 to switch between tracking servo control and center point servo control. The servo switching control unit 25 receives as input a control signal input from a not illustrated external control unit and a signal indicating the traverse interval input from the tracking error signal frequency detection unit: 24. Further, the servo switching control unit 25 outputs predetermined control signals including the center point servo enable signal for controlling the center point servo control unit 23 and the switch 26 and the tracking servo enable signal for controlling the tracking servo control unit 22.

At the time of an usual tracking operation, the servo switching control unit 25 turns on the tracking servo control with respect to the tracking servo control unit 22 by the tracking servo enable signal, turns off the center point servo control with respect to the center point servo control unit 23 by the center point servo enable signal, and changes the selection of the switch 26 to a terminal "a". By this, the tracking servo signal TS output from the tracking servo control unit 22 is output to the tracking coil drive amplifier 33 and tracking servo control is carried out.

Further, when the sled movement of the optical pick-up is started by a seek operation, e.g. the tracking servo enable signal is turned off and a control signal that controls the sled movement of the tracking servo control unit 22 is output to the tracking servo control unit 22. Further, the center point servo enable signal is turned on to make the center point servo control unit 23 valid and, at the same time, make the center point switch 26 select terminal "b". By this, the center point servo signal CS output from the center point servo control unit 23 is output to the tracking coil drive amplifier 33 and center point servo control is carried out.

Then, when the sled movement is ended, the traverse interval input from the tracking error signal frequency detection unit 24 is compared with a predetermined value which is determined in advance. When the traverse interval becomes longer than the predetermined interval, the center point servo enable signal is turned off again, the tracking servo enable signal is turned on, and the control mode is switched from the center point servo control to the tracking servo control.

The switch 26 selects either of the tracking servo signal TS output from the tracking servo control unit 22 or the center point servo signal CS output from the center point servo control unit 23 based on the switching signal which is substantially the same as the center point servo enable signal input from the servo switching control unit 25, and outputs the same to the tracking coil drive amplifier 33.

The sled motor drive amplifier 31 of the operation unit 30 amplifies the current of the sled servo signal SS output from the tracking servo control unit 22 to drive the sled motor 32, generates the sled motor drive signal SD, and outputs the same to the sled motor 32.

The tracking coil drive amplifier 33 amplifies the current of the center point servo signal CS or the tracking servo signal TS output from the switch 26 in order to drive the tracking coil 34, generates the tracking coil drive signal TD, and outputs the; same to the tracking coil 34.

Figure 5:
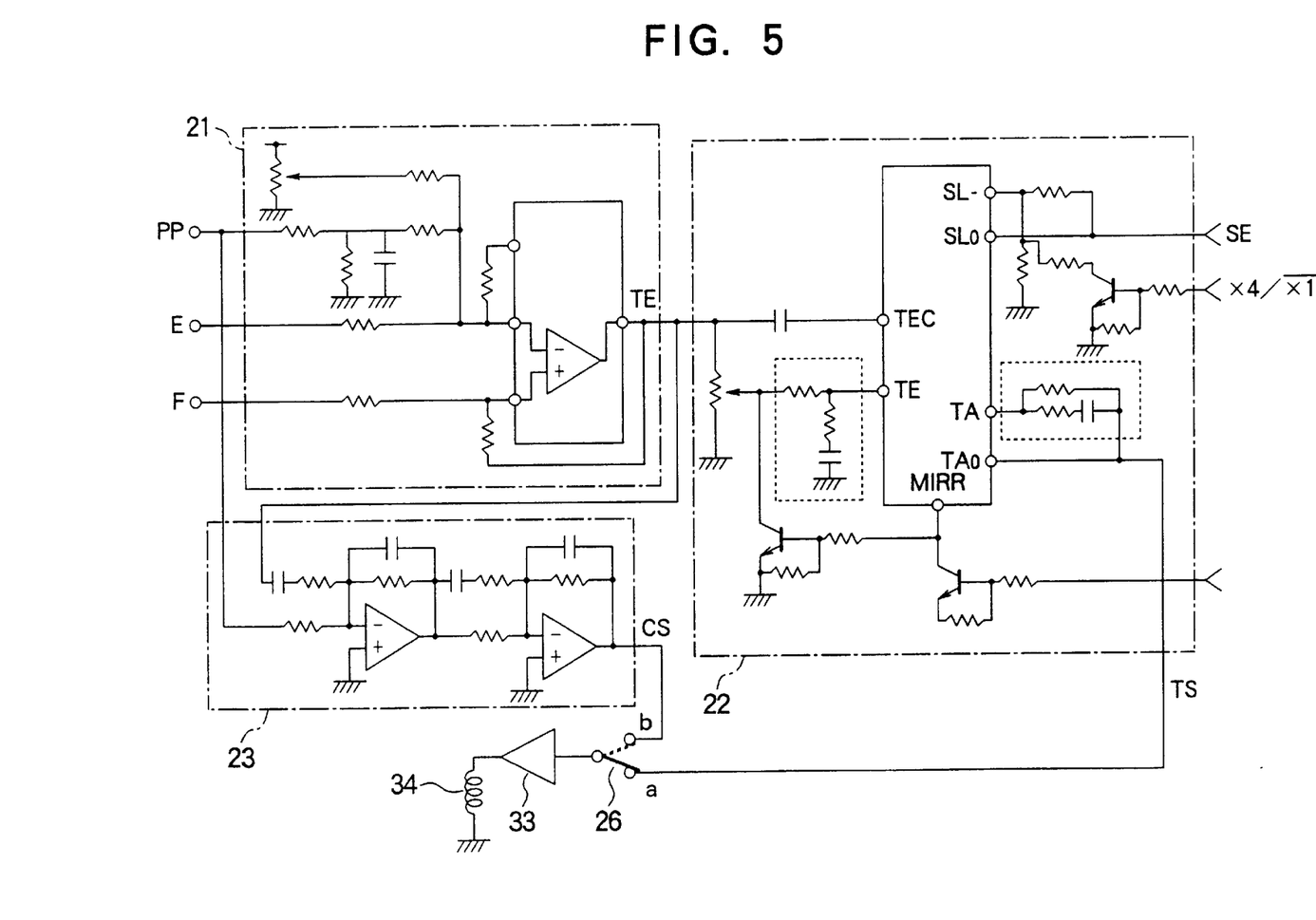
FIG. 5 is a view of the concrete circuits of a tracking error calculation unit, a tracking servo control unit, and a center point servo control unit of the tracking servo control system shown in FIG. 3.

Detailed circuits of the tracking error calculation unit 21, the tracking servo control unit 22, and the center point servo control unit 23, which are the main circuits for servo control in the tracking servo control system 1 having such a configuration, are shown in FIG. 5.

Next, an explanation will be made of the operation of the tracking servo control system 1 by referring to FIGS. 6A to 6D.

In the usual tracking state, the tracking error signal TE is generated at the tracking error calculation unit 21 based on a signal detected at the error signal detection unit 10, the tracking error signal TE is amplified with a predetermined gain at the tracking servo control unit 22, phase compensation is carried out to generate the tracking servo signal TS, and the signal TS is input to the tracking coil drive amplifier 33 via the switch 26. Then, the tracking drive signal TD actually driving the tracking coil 34 is generated in the tracking coil drive amplifier 33 and supplied to the tracking coil 34. As a result, the object lens 11 of the optical pick-up is controlled to suitably emit the optical beam to the desired track of the optical disc.

When a seek operation is carried out when performing such a tracking operation, first the tracking servo enable signal is turned off as shown in FIG. 4D. Then, in the tracking servo control unit 22, the sled servo signal SS for moving the optical pick-up to the desired track is generated and output to the sled motor drive amplifier 31. Then, in the sled motor drive amplifier 31, the sled drive signal SD for actually driving the sled motor 32 as shown in FIG. 4A is generated and supplied to the sled motor 32. The optical pick-up is moved to the desired track of the optical disc by this.

Figure 6A:
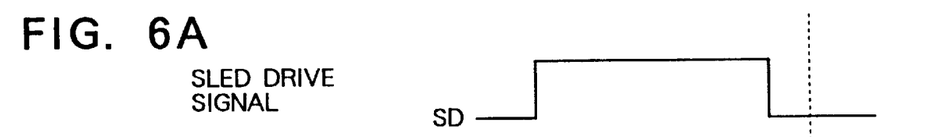
FIG. 6A is a view of a sled drive signal SD.
Figure 6B:
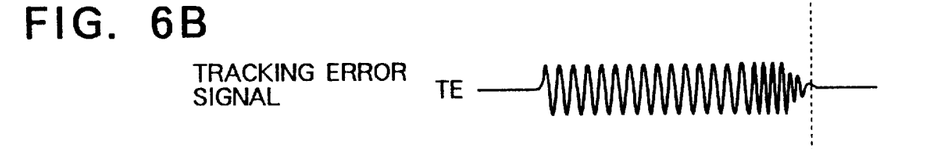
FIG. 6B is a view of a tracking error signal TE.
Figure 6C:
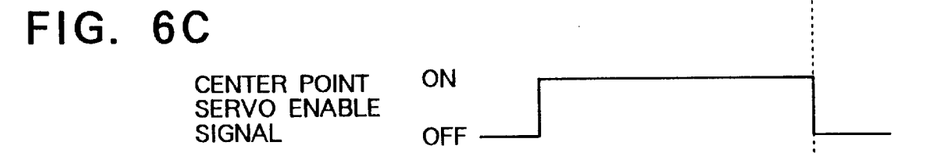
FIG. 6C is a view of a center point servo enable signal.
Figure 6D:
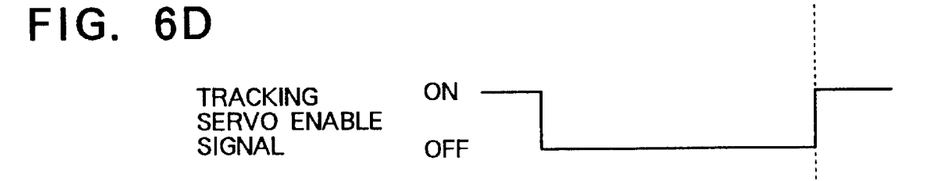
FIG. 6D is a view of a tracking servo enable signal.

Further, at this time, the center point servo enable signal as shown in FIG. 6C is input from the servo switching control unit 25 to the center point servo control unit 23 and the switch 26, the terminal "b" is selected at the switch 26, and the control mode is switched from tracking servo control to center point servo control.

Namely, in the center point servo control unit 23, a center point error signal corresponding to the amount of deviation of the object lens 11 from the center of the sight is generated based on the tracking error signal TE input from the tracking error calculation unit 21 and the push/pull signal PP input from the error signal detection unit 10. The error signal is amplified with the predetermined gain and phase-compensated to thus generate the center point servo signal CS. The center point servo signal CS is input to the tracking coil drive amplifier :33 via the switch 26, then the tracking drive signal TD for actually driving the tracking coil 34 is generated and supplied to the tracking coil 34. By this, the object lens 11 is maintained at the center of the field during the period when the sled movement of the optical pick-up is carried out.

Further, at the time of this seek operation, the tracking error signal frequency detection unit 24 is made substantially valid, the traverse signal is found by the tracking error signal TE input from the tracking error calculation unit 21 as shown in FIG. 6B, and the signal indicating the traverse interval is output to the servo switching control unit 25. Then, when the sled movement is ended, the servo switching control unit 25 compares the traverse interval input from the tracking error signal frequency detection unit 24 with the predetermined interval which is determined, in advance. Then, when the traverse interval detected at the tracking error signal frequency detection unit 24 becomes longer than the predetermined interval determined in advance in the servo switching control unit 25, the signal indicating this is output to the not illustrated control unit and, at the same time, the switch 26 is changed over to terminal "a". As a result, the tracking servo control unit 22 performs tracking pull-in by the tracking error signal TE output from the tracking error calculation unit 21, the frequency becomes sufficiently low, and the usual tracking servo control is carried out again.

In this way, in the tracking servo control system 1 of the present embodiment, when performing the sled movement, the control mode is switched from the center point servo control to the tracking servo control after confirming that the frequency of the tracking error signal becomes sufficiently low. Accordingly, the disadvantage that the servo control of the tracking operation cannot be carried out since the frequency at the "track on" state is too high can be prevented, smooth track pull-in becomes possible, and the access becomes stable. Further, it is not necessary to set aside an unnecessary margin of time until the control mode is switched to the tracking servo control, and therefore the access speed can be made high.

Note that, the present invention is not limited to the present embodiment. Various modifications are possible.

For example, as a reference signal for detecting that the frequency of the tracking error signal is sufficiently low, a traverse signal generated by a comparison with the tracking error signal is used in the present embodiment, but any signal directly or indirectly corresponding to the frequency of the tracking error signal can be used. For example, a track count signal that is generated by counting the RF envelopes can be used.

According to the present invention, an optical disc apparatus can be provided with which access accompanied by a seek operation can be carried out stably and at a high speed.

Further, a control method of an optical disc is provided that enables access to an optical disc at a high speed and a greater stability.

What is claimed is:

1. An optical disc apparatus for recording and/or reproducing with respect to an optical disc, comprising:

a light source which emits a laser beam;

an object lens which focuses said laser beam emitted from said light source toward said optical disc;

a supporting device which supports said object lens as said object lens can move in at least a radial direction of said optical disc;

a sled portion which holds said supporting device as said supporting device and can move in the radial direction of said optical disc;

a transporting means for moving said sled portion in the radial direction of said optical disc;

a center point servo control means for detecting the movement of said object lens and driving said supporting device so that said object lens is maintained at a predetermined position based on said detected movement;

a tracking servo control means for generating a tracking error signal and driving said supporting device based on said tracking error signal;

a frequency detecting means for detecting the frequency of said tracking error signal; and a servo control switching means for selectively switching an effective servo control means toward said supporting device between said center point servo control means and said tracking servo control means based on the detected frequency by said frequency detecting means.

2. An optical disc apparatus as set forth in claim 1, wherein said frequency detecting means detects a predetermined signal corresponding to the frequency of the tracking error signal and detects that the frequency of the tracking error signal becomes lower than a predetermined frequency based on the detected predetermined signal, and said servo control switching means switches said effective servo control means based on the detected result by said frequency detecting means.

3. An optical disc apparatus as set forth in claim 1, wherein said servo control switching means makes said center point servo control means valid when the movement of said sled portion is carried out by said transporting means so that the center point servo control is carried out, and makes said tracking servo control means valid when it is detected that the frequency of said tracking error signal becomes lower than a predetermined frequency by said frequency detecting means after the end of movement of said sled portion so that the tracking servo control is carried out.

4. An optical disc apparatus as set forth in claim 1, wherein;

said frequency detecting means detects a track count signal based on the tracking error signal, and said servo control switching means detects that said tracking error signal becomes lower than a predetermined frequency based on a timing of the track count in the detected track count signal and switches the effective servo control from the center point servo control to the tracking servo control.

5. An optical disc apparatus for recording and/or reproducing with respect to an optical disc, comprising:

a transporting means for moving an optical pick-up in the radial direction of the optical disc for accessing to a desired track of the optical disc;

a center point servo control means for detecting the movement of an object lens of the optical pick-up and driving a tracking actuator provided in said optical pick-up so that said object lens is maintained at a predetermined standard position;

a tracking servo control means for generating a tracking error signal and driving said tracking actuator based on said tracking error signal;

a frequency detecting means for detecting the frequency of said tracking error signal, by detecting a predetermined signal corresponding to the frequency of the tracking error signal and detecting that the frequency of the tracking error signal becomes lower than a predetermined frequency based on said detected predetermined signal; and a servo control switching means for selectively switching an effective servo control means between said center point servo control means and said tracking servo control means based on the detected output result by said frequency detecting means.

6. An optical disc apparatus as set forth in claim 5, wherein said servo control switching means makes said center point servo control means valid when the movement of said optical pick-up is carried out by said transporting means so that the center point servo control is carried out, and makes said tracking servo control means valid when it is detected that the frequency of said tracking error signal becomes lower than the predetermined frequency by said frequency detecting means after the end of movement of said optical pick-up so that the tracking servo control is carried out.

7. An optical disc apparatus as set forth in claim 5, wherein:

said frequency detecting means detects a track count signal based on the tracking error signal, and said servo control switching means detects that said tracking error signal becomes lower than the predetermined frequency based on a timing of the track count in the detected track count signal and switches the effective servo control from the center point servo control to the tracking servo control.

8. A method of tracking control of an optical disc apparatus, including the steps of:

carrying out center point servo control for driving a tracking actuator of an optical pick-up so that an object lens mounted on the optical pick-up is maintained at a center of a standard scope when a movement for moving the optical pick-up in a radial direction of the optical disc is started to access a desired track position;

detecting a tracking error signal for driving the tracking actuator;

detecting a predetermined signal corresponding to the frequency of the tracking error signal when the movement of said optical pick-up is ended;

detecting whether or not the frequency of said tracking error signal is lower than a predetermined frequency based on said detected predetermined signal; and switching the control mode from said center point servo control to the tracking servo control for driving the tracking actuator so as to adequately follow the track based on said tracking error signal when the frequency of said tracking error signal is lower than the predetermined frequency.

* * * * *